US012456157B2

(12) United States Patent
Singh et al.

(10) Patent No.: US 12,456,157 B2
(45) Date of Patent: Oct. 28, 2025

(54) SYSTEMS AND METHODS FOR ADJUSTING FRAME RATE OF GRAPHICS INTENSIVE APPLICATIONS BASED ON PRIORITY TO IMPROVE INFORMATION HANDLING SYSTEM PERFORMANCE

(71) Applicant: DELL PRODUCTS L.P., Round Rock, TX (US)

(72) Inventors: Jasleen Singh, Austin, TX (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 272 days.

(21) Appl. No.: 18/130,860

(22) Filed: Apr. 4, 2023

(65) Prior Publication Data

US 2024/0338787 A1    Oct. 10, 2024

(51) Int. Cl.
*G06T 1/20* (2006.01)
*G09G 5/36* (2006.01)

(52) U.S. Cl.
CPC ............ *G06T 1/20* (2013.01); *G09G 5/363* (2013.01); *G09G 2340/0435* (2013.01); *G09G 2360/08* (2013.01)

(58) Field of Classification Search
CPC .. G06T 1/20; G09G 5/363; G09G 2340/0435; G09G 2360/08
USPC ........................................................ 345/522
See application file for complete search history.

(56) References Cited

U.S. PATENT DOCUMENTS

| | | | |
|---|---|---|---|
| 9,558,527 | B2 | 1/2017 | Sierra et al. |
| 11,194,470 | B2 | 12/2021 | Guerrero et al. |
| 2016/0314758 | A1* | 10/2016 | Moyes ................... G09G 5/001 |
| 2020/0134394 | A1* | 4/2020 | Teshome ................. G06N 7/01 |
| 2020/0348943 | A1* | 11/2020 | Martinez .............. G06F 21/575 |
| 2021/0234938 | A1* | 7/2021 | Cox .................. H04M 1/72448 |
| 2021/0256652 | A1* | 8/2021 | Suryanarayana ...... G09G 5/395 |
| 2021/0294588 | A1* | 9/2021 | Gupta ..................... G06F 21/50 |
| 2021/0342192 | A1* | 11/2021 | Hamlin .................. G06F 9/485 |
| 2023/0125489 | A1 | 4/2023 | Vichare et al. |

OTHER PUBLICATIONS

Dell, Dell Optimizer 2.0, Article No. 000184590, Apr. 6, 2021, 71 pgs.

* cited by examiner

*Primary Examiner* — Prabodh M Dharia
(74) *Attorney, Agent, or Firm* — Egan, Enders & Huston LLP.

(57) ABSTRACT

Systems and methods are provided that may be implemented on an information handling system to improve the performance of currently-executing target application/s by dynamically adjusting or changing the graphics frame rate (frames per second "FPS") of other concurrently-executing application/s that are utilizing graphics resources. The disclosed systems and methods may be implemented to use resource sharing (e.g., central processing unit (CPU)/graphics processing unit (GPU) power sharing) in the system to provide more system resources to the system and the target application/s. The disclosed systems and methods may be so implemented to understand which application/s are currently running in the foreground or are predicted to be used and interacted with by the user, and to understand which remaining currently-executing background application/s are graphics intensive.

20 Claims, 3 Drawing Sheets

SYSTEMS AND METHODS FOR ADJUSTING FRAME RATE OF GRAPHICS INTENSIVE APPLICATIONS BASED ON PRIORITY TO IMPROVE INFORMATION HANDLING SYSTEM PERFORMANCE

FIELD

This application relates to operating systems of information handling systems and, more particularly, to adjusting displayed frame rate of applications executing on information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In an information handling system environment where multiple applications are running at the same time, the user may interact with multiple applications simultaneously, especially when connected to multiple display device screens. Current solutions focus on improving the performance of only one application for one resource. But in the real world, an application uses multiple resources at different percentages, and a user uses multiple applications at the same time.

Prior implementations of performance optimization operate to reducing the performance of one component in the system so that more power is made available to another component in the system. For example, graphics processing unit (GPU) clock speed of a system is reduced in order to allow more power to be made available from the GPU to the system central processing unit (CPU), which increases performance of a target CPU-based application that is currently executing on the system. However, reducing the GPU clock speed reduces the performance of all applications currently executing on the system that use graphics resources of the GPU. Thus, using this conventional technique, the performance of only one target CPU-based application is improved. Such a conventional technique is inadequate for situations where a user is using multiple target applications that are concurrently executing on the same system.

SUMMARY

Disclosed herein are systems and methods that may be implemented on an information handling system to improve the performance of currently-executing target application/s by dynamically adjusting or changing the graphics frame rate (frames per second "FPS") of other concurrently-executing application/s that are utilizing graphics resources. The disclosed systems and methods may be implemented in one embodiment to use resource sharing (e.g., central processing unit (CPU)/graphics processing unit (GPU) power sharing) in the system to provide more system resources to the system and the target application/s, e.g., that may include foreground executing applications that are also currently being interacted with by a system user and/or applications that are predicted to be used and interacted with by the user. In one embodiment, the disclosed systems and methods may be so implemented to understand which application/s are currently running in the foreground and also being interacted with by a user or are predicted to be used and interacted with by the user, and to understand which remaining currently-executing background application/s are graphics intensive.

In one embodiment, an artificial intelligence (AI) engine may be implemented to us machine learning (ML) to designate and prioritize multiple target applications that are currently executing on an information handling system for a user. In this embodiment, granular control may be implemented at an application or process level for all applications and processes running in the system to tune the system dynamically in a way that improves the performance of these designated multiple target applications. In one embodiment, a capability may be implemented to tune the system at an application level.

The disclosed systems and methods may be implemented to improve performance of concurrently-executing target applications dynamically in a scenario where a user is simultaneously interacting with, or is predicted to be interacting, with multiple applications. In one embodiment, the disclosed systems and methods may be implemented to understand how a particular user interacts with an information handling system and its executing applications and to control system behavior based on this understanding to create a more personalized experience. In one embodiment, information handling system resources may be redistributed in an intelligent manner to improve the user experience, and in one embodiment may be implemented to so redistribute resources in a manner that is particular advantageous for small form factor (SFF) information handling systems that having constrained or limited system resources.

In various embodiments, the disclosed systems and methods may be implemented to use machine learning to predict the levels of each system resource being utilized by each executing application (target application/s and background application/s) by using historic user usage data and a rolling or sliding window analysis to make a more accurate prediction, to use resource utilization control targeted at the process level (frames per second per application or process) instead of system level controls in a manner that allows targeted reduction of resource utilization and which leads to a broader improvement of performance of concurrently-executing target applications.

In one respect, disclosed herein is an information handling system, including: at least one display device; at least one graphics processing unit (GPU) that executes graphics resources; and at least one programmable integrated circuit. The at least one programmable integrated circuit may be programmed to: execute multiple applications concurrently, where each of the concurrently executing multiple applications utilizes the graphics resources of the information handling system to display visual images on the display device, designate a first portion of the concurrently executing multiple applications as target applications for a current user of the information handling system, and then reduce a graphics frame rate of a second portion of the concurrently executing multiple applications to display visual images on the display device of the information handling system, the second portion of the concurrently executing multiple applications not being included in the designated first portion of the concurrently executing multiple applications, and where each of the second portion of the concurrently executing multiple applications utilizes the graphics resources of the information handling system to display visual images on the display device of the information handling system.

In another respect, disclosed herein is a method, including: executing multiple applications concurrently on a programmable integrated circuit of an information handling system, each of the concurrently executing multiple applications utilizing graphics resources of the information handling system to display visual images on a display device of the information handling system; designating a first portion of the concurrently executing multiple applications as target applications for a current user of the information handling system; and then reducing a graphics frame rate of a second portion of the concurrently executing multiple applications to display visual images on the display device of the information handling system, the second portion of the concurrently executing multiple applications not being included in the designated first portion of the concurrently executing multiple applications, and each of the second portion of the concurrently executing multiple applications utilizing graphics resources of the information handling system to display visual images on the display device of the information handling system.

DESCRIPTION OF ILLUSTRATIVE EMBODIMENTS

Figure 1:
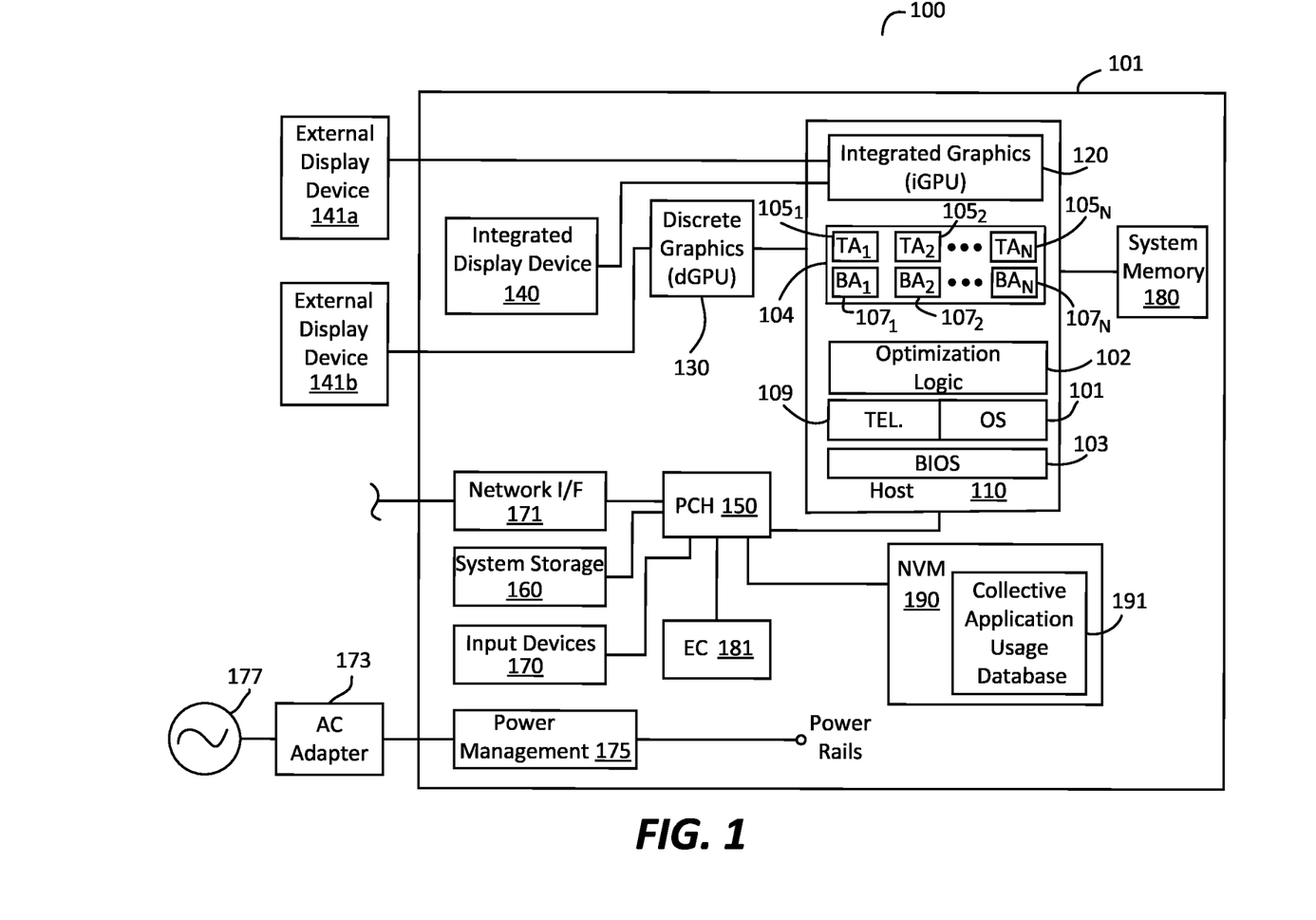
FIG. 1 illustrates a block diagram of an information handling system according to one exemplary embodiment of the disclosed systems and methods.

FIG. 1 is a block diagram of one embodiment of an information handling system 100, in this embodiment configured as a battery-powered notebook computer, although the disclosed systems and methods may be similarly implemented on other types of information handling systems (e.g., a desktop computer, tower computer, all-in-one computer, tablet computer, etc.). In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, an information handling system implementing the disclosed systems and methods is not restricted to including only those components shown in FIG. 1 and described below. Rather, an information handling system implementing the disclosed systems and methods may include additional, fewer or alternative components.

As shown in FIG. 1, information handling system 100 includes a chassis enclosure (e.g., a plastic and/or metal housing) that encloses internal integrated components of information handling system 100. In this embodiment, information handling system 100 includes a host programmable integrated circuit 110, e.g., such as an Intel central processing unit (CPU), an Advanced Micro Devices (AMD) CPU or another type of host programmable integrated circuit. In the embodiment of FIG. 1, host programmable integrated circuit 110 executes logic or code that includes a system basic input/output system (BIOS) 103, an operating system (OS) 101 (e.g., proprietary OS such as Microsoft Windows 10, open source OS such as Linux OS, etc.), a system optimization logic 102 (e.g., such as Dell Optimizer available from Dell Technologies Inc. of Round Rock, Texas) that obtains telemetry from OS 101 via plug-ins, and user applications 104 (e.g., email application, calendar application, web conference application, computer game application, note-taking application, photo editing application, weather simulator application or other type of simulation application, message application, word processing application, Internet browser, PDF viewer, spreadsheet application, etc.) that include target applications 105 and background applications 107.

In the illustrated embodiment, host programmable integrated circuit 110 may be coupled as shown to an internal (integrated) display device 140 and/or an external display device 141a, each of which may be a LCD or LED display, touchscreen or other suitable display device having a display screen for displaying visual images to a user. In this embodiment, integrated graphics capability may be implemented by host programmable integrated circuit 110 using an integrated graphics processing unit (iGPU) 120 to provide visual images (e.g., a graphical user interface, static images and/or video content, etc.) to internal display device 140 and/or to external display device 141a for display to a user of information handling system 100. Also in this embodiment, an internal discrete graphics processing unit (dGPU) 130 may be coupled as shown between host programmable integrated circuit 110 and external display device 141b which has a display screen for displaying visual images to the user, and dGPU 130 may provide visual images (e.g., a graphical user interface, static images and/or video content, etc.) to external display device 141b for display to the user of information handling system 100.

In some embodiments, dGPU 130 may additionally or alternatively be coupled to provide visual images (e.g., a graphical user interface, static images and/or video content, etc.) to internal display device 140 and/or to external display device 141a for display to a user of information handling system 100. In some embodiments, a graphics source for internal display device 140, external display device 141a and/or 141b may be switchable between iGPU 120, dGPU 130 and an eGPU when the latter is present. In other embodiments, an external GPU (xGPU) may additionally or alternatively be coupled between host programmable integrated circuit 110 and an external display device such as external display device 141a, 141b or another external display device. Further information on different configurations, operation and switching of iGPUs, dGPUs and xGPUs may be found, for example, in U.S. Pat. No. 9,558,527 which is incorporated herein by reference in its entirety for all purposes.

As shown in FIG. 1, user applications 104 executing on programmable integrated circuit 110 may include one or more executing target applications $105_1$ to $105_N$ and one or more executing background applications $107_1$ to $107_N$. Target applications 105 are those executing applications 104 that have been identified and designated as target applications 105 (e.g., based on user application usage data using methodology of FIG. 2 described further herein). Background applications 107 are those remaining executing applications 104 that are not designated as target applications 105.

As further shown in FIG. 1, host programmable integrated circuit 110 may be coupled to volatile system memory 180, which may include, for example, random access memory (RAM), dynamic RAM (DRAM), synchronous DRAM (SDRAM). Host programmable integrated circuit 110 may also be coupled to access non-volatile memory 190 (e.g., such as serial peripheral interface (SPI) Flash memory) for purposes such as to load and boot system basic input/output system (BIOS) 103 that is stored thereon, etc.

In FIG. 1, PCH 150 controls certain data paths and manages information flow between components of the information handling system 100. As such, PCH 150 may include one or more integrated controllers or interfaces for controlling the data paths connecting PCH 150 with host programmable integrated circuit 110, local system storage 160, input devices 170 forming at least a part of a user interface for the information handling system, network interface (I/F) device 171, embedded controller (EC) 181, and NVM 190, e.g., where BIOS firmware image and settings may be stored together with other components including ACPI firmware, etc. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface.

In the embodiment of FIG. 1, external and/or internal (integrated) input devices 170 (e.g., a keyboard, mouse, touchpad, touchscreen, etc.) may be coupled to PCH 150 of system 100 to enable the system end user to input data and interact with information handling system 100, and to interact with user applications 104 or other software/firmware executing thereon. The network I/F device 171 enables wired and/or wireless communication with remote information handling systems via an external network (e.g., the Internet and/or corporate intranet), and in one embodiment may be a network interface controller (NIC) which may communicate with the external network across an intervening local area network (LAN), wireless LAN (WLAN), cellular network, etc. Local system storage 160 (e.g., one or more media drives, such as hard disk drives, optical drives, NVRAM, Flash memory, solid state drives (SSDs), or any other suitable form of internal or external storage) that is coupled through PCH 150 to provide non-volatile storage for information handling system 100.

In the illustrated embodiment, a power source for the information handling system 100 may be provided by an external power source (e.g., mains power 177 and an AC adapter 173) and/or by an internal power source, such as a battery. As shown in FIG. 1, power management system 175 may be included within information handling system 100 for moderating and switching the available power from the power source/s. In one embodiment, power management system 175 may be coupled to provide operating voltages on one or more power rails to one or more components of the information handling system 100, as well as to perform other power-related administrative tasks of the information handling system.

In the embodiment of FIG. 1, embedded controller (EC) 181 is coupled to PCH 150 and may be configured to perform functions such as power and thermal system management, etc. EC 181 may also be configured to execute program instructions to boot information handling system 100, load application firmware from NVM 190 into internal memory, launch the application firmware, etc. In one example, EC 181 may include a microcontroller or other programmable integrated circuit for executing program instructions to perform the above-stated functions.

Figure 2:
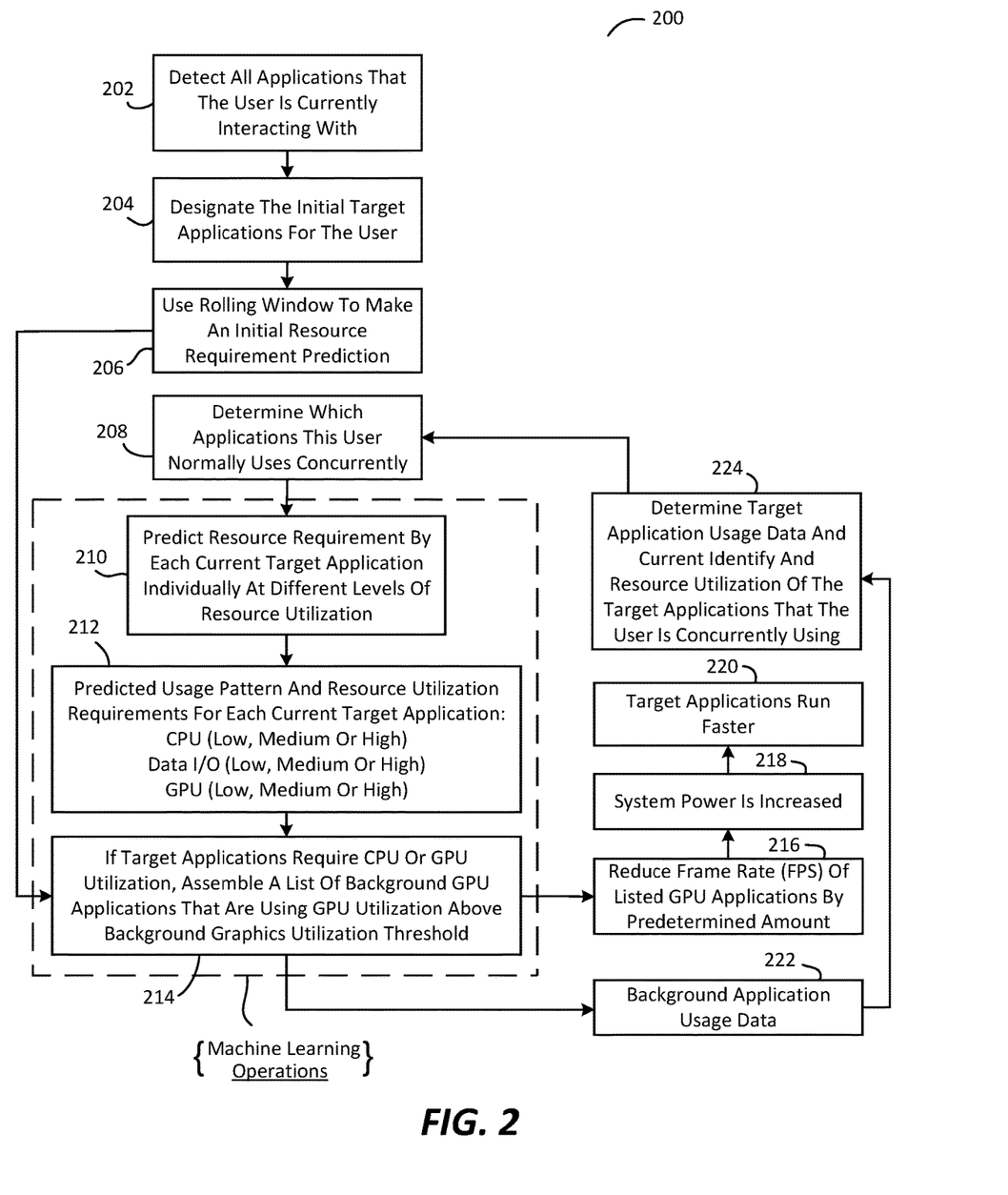
FIG. 2 illustrates methodology according to one exemplary embodiment of the disclosed systems and methods.

FIG. 2 illustrates methodology 200 that may be implemented according to one exemplary embodiment of the disclosed systems and methods, e.g., by system optimization logic 102 executing on information handling system 100. Methodology 200 may be implemented to be aware of the execution and system resource utilization of user applications 104 that are executing to display visual images on display devices 140 and 141 of information handing system 100. Methodology 200 accomplishes this awareness by achieving a dynamic understanding of which of the one or more of the user applications 104 with which the user is currently interacting with, and by predicting which of the one or more of the user applications 104 the user will be interacting. Using methodology 200, system user experience may be improved by improving the performance of all concurrent applications that the user is currently and simultaneously interacting with by predicting which of the user applications 104 will be target applications 105 for the current user. As further described herein, the prediction of target applications 105 may be achieved by using a function of application usage data (e.g., application utilization percentage, usage latency, user interaction and time, etc.) to predict the target applications 105 for the current user.

Although described in relation to the particular configuration of information handling system 100 of FIG. 1, the disclosed systems and methods may be implemented using other configurations of information handling systems.

Still referring to FIG. 2, blocks 202 to 206 of methodology 200 may be performed only the first time that methodology 200 is performed, e.g., upon system start up and OS boot before any application usage data has been analyzed and made available in block 208. Methodology 200 begins in block 202 where a current user of information handling system 100 is currently interacting with multiple applications 104 at the same time that system 100 is operating to display visual images from these applications 104 on one or more of integrated display device 103 and/or external display device/s 141a and/or 141b (e.g., external monitor/s). The user may be currently interacting with the multiple applications 104 by providing input data to the application from input device/s 170 (e.g., using mouse clicks, keyboard strokes, touchpad movements, touchscreen movements, etc.).

As just an example, the current user may be simultaneously using a web conference application to participate in a web conference session, using a note-taking application (e.g., such as Microsoft OneNote) to take some notes, using a simulation application to make simulation runs, and using a photo editing application to perform photo editing tasks. In such a case, the user is currently using more than a single application 104 as a target application 105, i.e., the user is instead simultaneously using multiple applications 104 as target applications 105 that are important and relevant.

In block 202 of methodology 200, all of the executing user applications 104 that the user is currently interacting with in the foreground are detected and identified, e.g., from BIOS and/or OS telemetry data provided by one or more telemetry utilities or other executing logic 109 (e.g., Microsoft Task Manager utility of Windows OS, BIOS driver, etc.) and/or other suitable user input and resource-monitoring software of firmware executing on host programmable integrated circuit 110. In one embodiment, the occurrence of user interaction with a given application 104 may be detected at a current time based on a measured duration and recency of input data provided from the user to the given application. In this embodiment, a user may only be considered to be currently interacting with a given application 104 if the user has provided input data to the given application 104 within a predefined preceding time period (e.g., within the most recent 5 seconds prior to the current system time), and has provided this user input to the given application 104 for at least a minimum amount of time (e.g., for at least 3 seconds cumulative time) within the predefined time period. Thus, in this example, a user will only be considered to be currently interacting with a given application 104 if the user has previously provided input data to the given application 104 for at least 3 seconds out of the most recent preceding 5 seconds time period prior to the current system time (i.e., a user will not be considered to be currently interacting with a given application 104 if the user has only previously provided input data to the given application 104 for 1 or 2 seconds out of the most recent preceding 5 seconds time period prior to the current system time). In block 204, each of the detected foreground user applications 104 with which the user is also currently interacting (from block 202) are initially designated as target applications 105. The remaining executing user applications 104 are initially designated as background applications 107.

Next, in block 206, the initial system resource utilization requirement (e.g., CPU requirement, data input/output (I/O) requirement, and GPU requirement) is predicted from the user's most recent application resource utilization data for each of the target applications 105 designated in block 204, e.g., by using a rolling or sliding window of the most recent historical user application utilization data, (e.g., CPU utilization, I/O utilization, and GPU utilization) obtained during the rolling or sliding window, e.g., from data provided by a utility (e.g., Microsoft Task Manager utility) of OS 101 and/or other suitable resource-monitoring software of firmware executing on host programmable integrated circuit 110. In one embodiment, the duration of the rolling or sliding data window of block 206 may be a few seconds (e.g., 5 seconds, from 3 to 5 seconds, etc.), it being understood that any other selected greater or lesser time period (e.g., such as 10 seconds, 5 to 10 seconds, 2-3 seconds, etc.) may be selected for the duration of the rolling window of most recent application use data. The predicted initial system resource utilization requirements for the initial target applications 105 may be made in block 206 for a selected time period, e.g., such as for the next 2 seconds or for another selected greater or lesser amount of time. In one embodiment, the predicted initial system resource utilization requirements for each of the initial target applications 105 may be determined to be the respective average utilization values (e.g., average CPU utilization, average I/O utilization, average GPU utilization, etc.) obtained for each initial target application 105 during the duration of the time period of the rolling or sliding window.

On its first pass, methodology 200 proceeds directly from block 206 to block 214 as shown, and uses the initial target applications 105 identified in block 204 and the predicated initial system resource utilization requirement for these initial target applications 105 from block 206. Then the application usage data of the background applications 107 (e.g., identity and resource utilization data) is provided in block 222 for storage and/or further use as needed in block 224 as shown.

In the first pass of block 214, it is determined if any of the initially designated target applications from block 206 require CPU or GPU utilization. If so, then a list of all of the initially designated background user applications 107 from block 206 (or otherwise detected to be running in the background) that are each currently using a GPU utilization above a predefined background graphics utilization threshold is assembled, for example, from BIOS and/or OS telemetry data provided by one or more utilities or other executing logic (e.g., Microsoft Task Manager utility of Windows OS, BIOS driver, etc.) and/or other suitable user input and resource-monitoring software of firmware executing on host programmable integrated circuit 110). The predefined background graphics utilization threshold may be, for example, 5% GPU utilization be or many other greater or lesser GPU utilization threshold amount)

Then, in block 216, the value or rate of the generated and displayed graphics frame rate of any listed background user applications 107 from block 214 is reduced (e.g., tuning knob technique) by a predetermined frame rate reduction amount (e.g., such as by 20% of the current displayed FPS, by 25-30% of the current displayed FPS, or by any other predetermined greater or lesser percentage or ratio of the current displayed FPS value of each listed background user application 107) in order to boost performance of the identified target applications 105. As an illustrative example, a 60 FPS frame rate of a given listed background application 107 may be reduced from 60 FPS to 48 FPS in block 216 using a predetermined frame rate reduction amount of 20%. As another illustrative example, a 60 FPS frame rate of a given listed background application 107 may be reduced from 60 FPS to 42 FPS in block 216 using a predetermined frame rate reduction amount of 30%.

Due to the frame rate reduction performed in block 216, less system power is consumed to display any listed background user applications 107 from block 214, and more system power is therefore made available for system components (e.g., CPU, GPUs, etc.) to execute and display the initially designated target applications 105 in block 220. As a consequence, more power is provided to the system and the initially designated target applications 105 run faster and perform better in block 220. In this regard, performance increases exponentially for target applications 105 that stress the system more for resources.

Next, in block 224, the current identity and resource utilization of each of the target applications 105 that the user is concurrently using is determined, e.g., by collecting this historical data during a rolling or sliding window of the most recent application utilization data, (e.g., application identity, CPU utilization, I/O utilization, and GPU utilization) obtained during a rolling or sliding window that may be of the same length as described for use in block 206. Using a rolling or sliding window to collect this historical data acts to counter any fluctuation/s in the data that is collected to make a prediction in blocks 206 and 210 (described further below), therefore reducing the chance of making a wrong prediction.

This current identity and resource utilization of each of the target applications 105 that is determined for the current iteration may be stored and added to a database 191 of collective application usage data for the user (e.g., including a listing of the application identity, cumulative usage time, and cumulative average resource utilization for all the target applications 105 used by the user during all of the preceding iterations of methodology 200) that may be maintained on NVM 190, or that may be maintained on other non-volatile storage such as system storage 160, or one volatile main system memory 180 (in which case it will be available only for the current OS session). In block 224, the application usage data of the background applications 107 (e.g., identity and resource utilization data) provided in the current iteration of block 222 may also be stored and added to the collective application usage data of database 191. Table 1 shows a hypothetical example of illustrative application usage data values such as may be stored and added to a database 191 of collective application usage data for the user.

TABLE 1

Illustrative Example Application Usage Data

| System Time Stamp (t) | Identity of Application Used | Cumulative Application Usage Time ($\Delta T$, seconds) | Average Resource Utilization During Cumulative Usage Time |
|---|---|---|---|
| $t_1$ | $104_1$ | $\Delta T_1$ | 15% CPU |
| $t_2$ | $104_2$ | $\Delta T_2$ | 8% data I/O |
| $t_3$ | $104_3$ | $\Delta T_3$ | 12% GPU, 10% CPU |
| ... | ... | ... | ... |

Methodology 200 then iteratively proceeds to block 208 where the collective application usage data of database 191 may be retrieved from storage or memory, and analyzed using machine learning (ML) to determine and designate the identity of the target applications 105 that are normally used concurrently by the user and the normal system resource utilization requirements (e.g., CPU utilization requirement, I/O utilization requirement, and GPU utilization requirement) for those normally used concurrently target applications 105. This may be determined, for example, by averaging the cumulative usage time of each of the target applications 105 currently contained in the collective application usage data of database 191, and then choosing a predefined maximum number (e.g., such as five or other predefined greater or lesser number) of target applications 105 having the highest cumulative average usage time as the target applications 105 that are normally used concurrently by the user. It will be understood that the identity of the target applications 105 that are normally used concurrently by the user may be determined from the collective application usage data of database 191 may be determined using any other suitable analysis (e.g., statistical analysis) technique/s. These identified target user applications 105 that have been normally used concurrently are designated in block 208 as the current target applications 105 for the current iteration of methodology 200. The remaining executing user applications 104 are designated as current background applications 107 for this iteration of methodology 200.

Next, in block 210, the system resource utilization requirements (e.g., CPU requirement, I/O requirement, and GPU requirement) and usage pattern for each of the currently designated target applications 105 (from most recent iteration of block 208) is individually predicted, e.g., using machine learning at the different levels of utilization of each current target application 105 from the collective application usage data of database 191 as updated in the most recent iteration of block 224. System resource utilization requirements for each of these currently designated target applications 105 may be so predicted in block 210 to allow reallocation of resources, and changing demand for system resource utilization requirements by currently designated target applications 105 executing together may be predicted. In this regard, each of these currently designated target applications 105 typically utilizes more than one system resource and multiple such designated target applications 105 executing concurrently utilize multiple system resources to different extents.

Usage pattern prediction may be so performed in block 210 using the historical data about the user (including the collective application usage data of database 191) to make a prediction about system resource utilization requirement. By understanding the identity of the concurrent target applications 105 that the user has been using in the past and the system resource utilization of all those concurrent target applications 105, a more informed decision regarding the future system resource utilization may be made.

In one embodiment of block 210, predicted system resource utilization requirements for each of the current target applications 105 may be characterized or otherwise determined according to multiple ranges of resource utilization requirement (e.g., as "low", "medium" or "high") and reported in block 212 with the predicted usage pattern of each of the current target applications 105.

Table 2 shows exemplary resource utilization requirement value ranges that may be employed in block 210 to characterize predicted system resource utilization requirements for each of the current target applications 105. In Table 2, the same number of ranges and the same numerical range of resource utilization values is used for each of the ranges of the different system resource types. However, it will be understood that it is possible that a greater or lesser number of resource utilization value ranges may be defined for each different type of system resource, and/or that the numerical range of resource utilization values may be different for each of the different types of system resource types. Moreover, besides CPU utilization, data I/O utilization and GPU utilization, it is possible that additional, fewer or alternative system resource types may be analyzed, predicted and characterized in other embodiments.

TABLE 2

Exemplary Resource Utilization Value Ranges

| System Resource Type | Low Resource Utilization Value Range, % | Medium Resource Utilization Value Range, % | High Resource Utilization Value Range, % |
|---|---|---|---|
| CPU | <5% | 5% to 10% | >10% |
| Data I/O | <5% | 5% to 10% | >10% |
| GPU | <5% | 5% to 10% | >10% |

Table 3 illustrates a hypothetical example of predicted and characterized system resource utilization requirements for each of three exemplary concurrently-executing target applications $105_1$ to $105_3$ that may be obtained and reported during blocks 210 and 212.

TABLE 3

Exemplary Predicted and Characterized System Resource Utilization

| Target Application | Predicted CPU Resource Utilization | Characterized CPU Resource Utilization | Predicted Data I/O Resource Utilization | Characterized Data I/O Resource Utilization | Predicted GPU Resource Utilization | Characterized GPU Resource Utilization |
|---|---|---|---|---|---|---|
| $105_1$ | 8% | Medium | 4% | Low | 12% | High |
| $105_2$ | 3% | Low | 9% | Medium | 5% | Medium |
| $105_3$ | 17% | High | 12% | High | 7% | Medium |

The methodology of blocks 210 and 212 provide an understanding and prediction of the system resource utilization requirements for the target applications 105 that are identified in block 208 as being normally used concurrently by the user. Methodology 200 then proceeds from block 212 to block 214.

In subsequent non-initial iterative passes of block 214, it is determined from predicted system resource utilization requirements (e.g., CPU utilization requirement, I/O utilization requirement, and GPU utilization requirement) and usage patterns of block 212 if any of the designated target applications 105 from block 208 require CPU or GPU utilization. If so, then a list of all of the currently designated background user applications 107 from block 208 (or otherwise detected to be currently running in the background) that are currently using GPU utilization above the previously-described predefined background graphics utilization threshold for block 214 is determined (e.g., from usage data obtained from a utility (e.g., Microsoft Task Manager utility) of OS 101 and/or other suitable resource-monitoring software of firmware executing on host programmable integrated circuit 110). Then, methodology 200 proceeds from block 214 to blocks 216 and 222 and iteratively repeats as shown and in a manner as previously described.

To illustrate a hypothetical example of performance of blocks 210 to 220, assume the user is concurrently using designated target applications 105 from block 208 that include a web conference application (e.g., consuming CPU and GPU resources) and a simulation application (e.g., consuming CPU resources). In this example, system resource utilization requirements for each of these designated target applications 105 may be predicted in block 210 and reported in block 212 as follows: low CPU utilization and medium GPU utilization for the target web conference application 105, and high CPU utilization for the target simulation application 105. In this example, one or more listed background applications 107 (e.g., web browser application, music streaming application, etc.) have been designated or otherwise detected as running in the background and determined in block 214 to be utilizing GPU resources greater than the predefined background utilization threshold previously described.

Based on the determination in block 214 that the currently designated target applications 105 require at least one of CPU or GPU resource utilization and that one or more listed background applications 107 are utilizing GPU resources greater than the predefined background utilization threshold, then the generated and displayed frame rate (FPS) is reduced for these listed background applications block 216 by the predetermined frame rate reduction amount in order to increase system power in block 218 to improve performance of the currently designated target applications 105 which run faster in block 220. In one embodiment, the frame rate reduction of the listed background applications performed in block 216 may advantageously result in minimal impact (e.g., causing no glitches, etc.) to the performance of the listed background applications 107 of block 214 and in a manner so that these listed background applications 107 do not starve for system resources.

Figure 3:
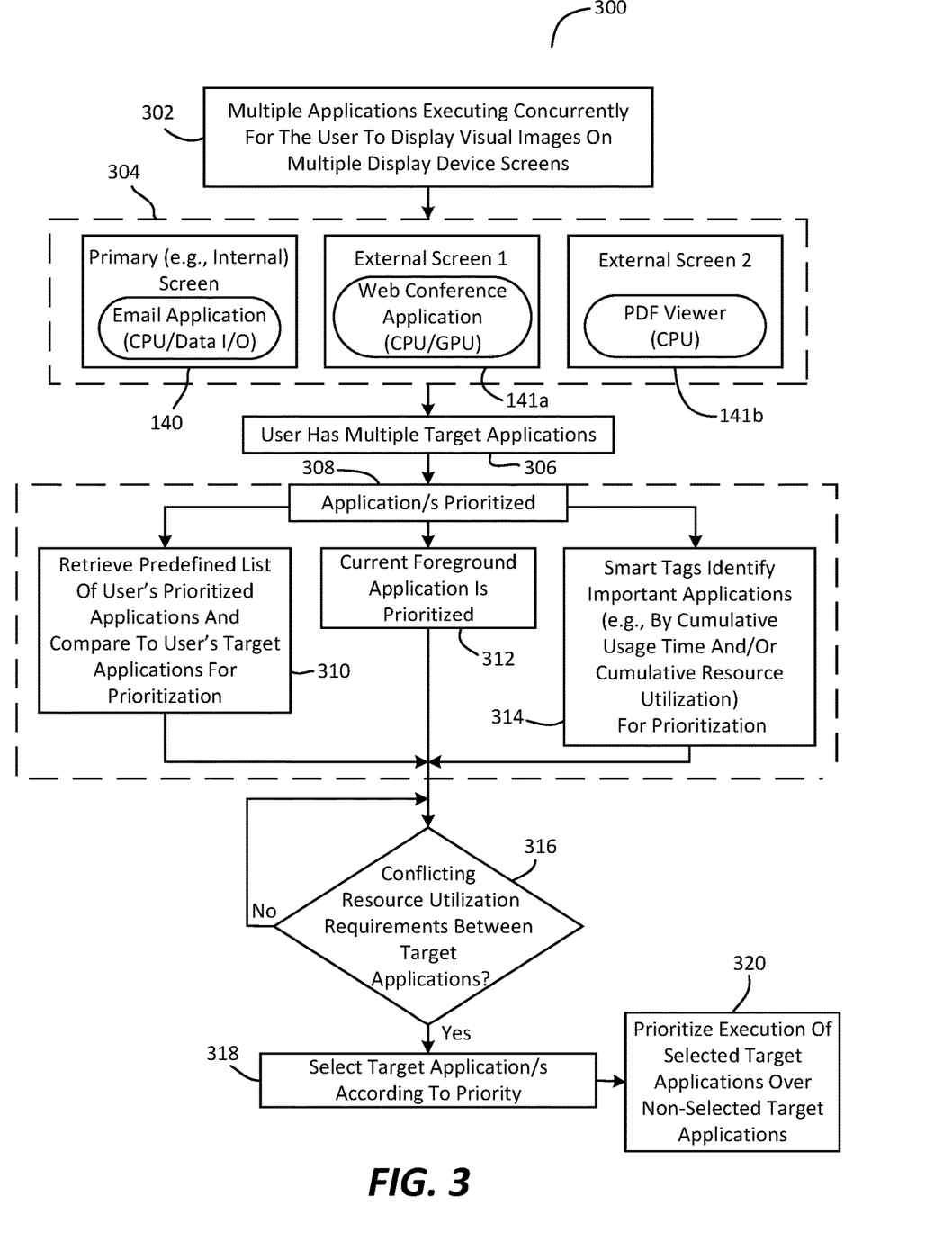
FIG. 3 illustrates methodology according to one exemplary embodiment of the disclosed systems and methods.

FIG. 3 illustrates a methodology 300 that may be implemented in one exemplary embodiment (e.g., by system optimization logic 102 executing on information handling system 100) to optionally prioritize one or more current target applications 105 relative to each other when needed, e.g., such as when available system resources of an information handling system 100 are insufficient to simultaneously support full resource utilization required for all of the currently designated target applications 105 that are being simultaneously used by a user.

Methodology 300 begins in block 302 with multiple applications 104 executing concurrently for a user on information handling system 100, with system 100 simultaneously displaying visual images from these concurrently executing applications 104 on respective display screens of multiple display devices 140, 141a and 141b. For example, as shown in block 304, internal display device 140 may be operating as a primary screen to display visual images generated by an executing email application 104 that is primarily consuming CPU and data I/O resources, external display device 141a may be operating as a first external screen to display visual images generated by an executing web conference application 104 that is primarily consuming CPU and GPU resources, and external display device 141b may be operating as a second external screen to display visual images generated by an executing PDF viewer application 104 that is primarily consuming CPU resources.

In block 306 of methodology 300, the user's multiple (e.g., three in this example) concurrently-executing applications 104 of block 304 have each been currently designated as a target application 105, e.g., such as in block 204 or block 208 of methodology 200 of FIG. 2. These designated target applications 105 may be prioritized relative to each other in block 308, e.g., using one of the criteria of blocks 310, 312 or 314.

In block 310, a user may have previously provided (e.g., entered via input devices 170) a predefined user priority list of one or more applications 104 that are to be prioritized, and this user priority list stored, e.g., in database 191 or other suitable location in non-volatile memory of storage of information handling system 100. In such a predefined user list includes multiple prioritized applications 104, the user may also prioritize these multiple applications 104 relative to each other. In block 310, the designated target applications 105 of block 306 may then be compared to the applications 104 included in the retrieved user priority list, and only those designated target applications 105 that are included in the user priority list may be prioritized relative to each other according to their relative priority in the user priority list.

In block 312, a user may be currently interacting with only a single application 104 in the foreground. In such a case, this single application 104 may be prioritized above all other applications 104.

In block 314, smart tags may be used to identify important applications 104 for the user from the collective application usage data in database 191. These identified important applications 104 may be selected, for example, as a function of cumulative usage time and/or cumulative resource utilization of the various applications 104. For example, the application having the greatest cumulative usage time may be ranked with the highest priority, the application having the second greatest cumulative usage time may be ranked with the second highest priority, etc. As another example, the application having the greatest cumulative resource utilization may be ranked with the highest priority, the application having the second greatest cumulative resource utilization may be ranked with the second highest priority, etc. As another example, the application having the greatest average value of cumulative usage time priority and cumulative resource utilization priority may be ranked with the highest priority, the application having the second greatest average value of cumulative usage time priority and cumulative resource utilization priority may be ranked with the second highest priority, etc.

Next, in block 316 it is determined whether a conflict exists between system resource utilization requirements of the multiple currently-designated target applications 105 (e.g., such as determined in block 210) after reducing background application frame rate in block 216, e.g., sufficient CPU, GPU, data I/O or other system resources are not available to fully satisfy the full resource needs of all the currently-designated multiple target applications 105 when executing concurrently. If not, methodology 300 repeats to block 316.

However, if in block 316 a conflict between system resource utilization requirements of the multiple currently-designated target applications 105 is determined to exist, then methodology 300 proceeds to block 318 where only those highest prioritized currently-designated target applications 105 from block 308 that can be fully serviced by the currently-available system resources (after background application frame rate reduction in block 216) are selected for execution with full (e.g., default) frame rate in the current iteration of block 220, e.g., only the single highest prioritized target application 105 is selected if there is only sufficient available system resources to meet the full resource needs for executing one of the currently-designated target applications 105, only the two highest prioritized target applications 105 are selected if there is only sufficient available system resources to meet the full resource needs for executing two of the currently-designated target applications 105, etc. Then, in block 320, execution of the selected target application/s 105 from block 318 is prioritized over execution of the remaining non-selected target application/s 105, e.g., by reducing the generated and displayed graphics frame rate (FPS) of each of the remaining non-selected currently-designated target applications 105 that are currently utilizing graphics resources by the same predetermined frame rate reduction amount applied to background applications 107 in the current iteration of block 216.

It will understood that the particular combination of steps of FIGS. 2 and 3 are exemplary only, and that other combinations of additional and/or alternative steps may be employed to improve the performance of currently-executing target application/s by dynamically adjusting or changing the graphics frame rate (FPS) of other concurrently-executing application/s that are utilizing graphics resources.

It will also be understood that one or more of the tasks, functions, or methodologies described herein (e.g., including those described herein for components 101, 102, 103, 104, 105, 107, 110, 120, 130, 140, 141, 150, 160, 171, 173, 175, 180, 181, 190, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
    at least one display device;
    at least one graphics processing unit (GPU) that executes graphics resources; and
    at least one programmable integrated circuit that is programmed to execute multiple applications concurrently such that each of the concurrently executing multiple applications executes at the same time as each of the other concurrently executing multiple applications and where each of the concurrently executing multiple applications utilizes the graphics resources of the information handling system to display visual images on the display device;
    where the at least one programmable integrated circuit is further programmed to perform the following while all of the concurrently executing multiple applications are executing and utilizing the graphics resources of the information handling system at the same time to display visual images on the display device:
        designate each application of a first portion of the concurrently executing multiple applications as a target application for a current user of the information handling system such that a second portion of the concurrently executing multiple applications includes all of the remaining concurrently executing multiple applications that are not designated as target applications and that are not included in the first portion of the concurrently executing multiple applications, and
        then reduce a graphics frame rate of each application of the second portion of the concurrently executing multiple applications to display visual images on the display device of the information handling system.

2. The information handling system of claim 1, where the at least one programmable integrated circuit is programmed to detect all of the executing user applications that the current user is currently interacting with in the foreground, and to designate each of the applications of the first portion of the concurrently executing multiple applications as target applications by designating all of the detected executing user applications that the current user is currently interacting with in the foreground as target applications.

3. The information handling system of claim 1, where the at least one programmable integrated circuit is programmed to determine collective application usage data for the current user that includes the identity and resource utilization of applications that the user has previously interacted with, and to designate each of the applications of the first portion of the concurrently executing multiple applications as target applications by determining the identity of applications that are normally used concurrently by the current user from the collective usage data, and to designate all the determined applications that are normally used concurrently by the current user as target applications.

4. The information handling system of claim 1, where the graphics frame rate of the second portion of the concurrently executing multiple applications used to display the visual images on the display device of the information handling system is a displayed frames per second (FPS) of the visual images displayed on the display device of the information handling system; and where the at least one programmable integrated circuit is programmed to reduce the displayed FPS of each of the applications of the second portion of the concurrently executing multiple applications to display the visual images on the display device of the information handling system by reducing the displayed FPS of each of the applications of the second portion of the concurrently executing multiple applications by a predetermined FPS amount.

5. The information handling system of claim 1, where the at least one programmable integrated circuit is programmed to determine collective application usage data for the current user that includes the identity and resource utilization of applications that the user has previously interacted with, and to predict system resource utilization requirements for each of the designated target applications of the first portion of the concurrently executing multiple applications from the collective application usage data for the current user.

6. The information handling system of claim 5, where the predicted system resource utilization requirements comprise at least one of central processing unit (CPU), graphic processing unit (GPU), or data input/output (I/O) utilization for each of the designated target applications of the first portion of the concurrently executing multiple applications.

7. The information handling system of claim 5, where the at least one programmable integrated circuit is programmed to use the predicted system resource utilization requirements to determine whether or not sufficient total system resources are available on the information handling system to simultaneously satisfy the predicted system resource utilization requirements of each of the designated concurrently executing target applications of the first portion of the concurrently executing multiple applications when all of the designated target applications are concurrently executing simultaneously with all of the applications of the second portion of the concurrently executing multiple applications executing with the reduced graphics frame rate, and then:
    simultaneously execute each of the designated target applications of the first portion of the concurrently executing multiple applications with a full non-reduced graphics frame rate if it is determined by the at least one programmable integrated circuit that sufficient total system resources are available to simultaneously satisfy the predicted system resource utilization requirements of all of the designated concurrently executing target applications of the first portion of the concurrently executing multiple applications; and
    execute one or more of the designated target applications of the first portion of the concurrently executing multiple applications that have a higher priority with a full non-reduced graphics frame rate while at the same time executing one or more of the designated target applications of the first portion of the concurrently executing multiple applications that have a lower priority with a reduced graphics frame rate if it is determined by the at least one programmable integrated circuit that sufficient total system resources are not available to simultaneously satisfy the predicted system resource utilization requirements of each of the designated concurrently executing target applications of the first portion of the concurrently executing multiple applications.

8. The information handling system of claim 5, where the at least one programmable integrated circuit is programmed to compare the identity of each of the designated target applications of the first portion of the concurrently executing multiple applications to a predefined list of prioritized applications to determine that at least a first one of the designated target applications of the first portion of the concurrently executing multiple applications has priority over at least one second one of the designated target applications of the first portion of the concurrently executing multiple applications, and execute the first designated target application of the first portion of the concurrently executing multiple applications with a full non-reduced graphics frame rate while at the same time executing the second designated target application of the first portion of the concurrently executing multiple applications with a reduced graphics frame rate if it is determined by the at least one programmable integrated circuit that sufficient total system resources are not available to simultaneously satisfy the predicted system resource utilization requirements of each of the designated concurrently executing target applications of the first portion of the concurrently executing multiple applications.

9. The information handling system of claim 5, where the at least one programmable integrated circuit is programmed to determine that a user is currently interacting with a first one of the designated target applications of the first portion of the concurrently executing multiple applications in the foreground, and then execute the first designated target application of the first portion of the concurrently executing multiple applications with a full non-reduced graphics frame rate while at the same time executing at least one other of the designated target applications of the first portion of the concurrently executing multiple applications with a reduced graphics frame rate if it is determined by the at least one programmable integrated circuit that sufficient total system resources are not available to simultaneously satisfy the predicted system resource utilization requirements of each of the designated concurrently executing target applications of the first portion of the concurrently executing multiple applications.

10. The information handling system of claim 5, where the at least one programmable integrated circuit is programmed to determine at least one prioritized application to prioritize over one or more other applications based on the collective application usage data, then determining whether any one of the designated target applications of the first portion of the concurrently executing multiple applications corresponds to the prioritized application, and then execute any designated target application of the first portion of the concurrently executing multiple applications that is determined to correspond to the prioritized application with a full non-reduced graphics frame rate while at the same time executing at least one other of the designated target applications of the first portion of the concurrently executing multiple applications that does not correspond to the prioritized application with a reduced graphics frame rate if it is determined by the at least one programmable integrated circuit that sufficient total system resources are not available to simultaneously satisfy the predicted system resource utilization requirements of each of the designated concurrently executing target applications of the first portion of the concurrently executing multiple applications.

11. A method, comprising:
concurrently executing multiple applications on a programmable integrated circuit of an information handling system such that each of the concurrently executing multiple applications executes at the same time as each of the other concurrently executing multiple applications and such that each of the concurrently executing multiple applications utilizing graphics resources of the information handling system to display visual images on a display device of the information handling system;
then performing the following while all of the concurrently executing multiple applications are executing and utilizing the graphics resources of the information handling system at the same time to display visual images on the display device:
designating each application of a first portion of the concurrently executing multiple applications as a target application for a current user of the information handling system such that a second portion of the concurrently executing multiple applications includes all of the remaining concurrently executing multiple applications that are not designated as target applications and that are not included in the first portion of the concurrently executing multiple applications; and
then reducing a graphics frame rate of each application of the second portion of the concurrently executing multiple applications to display visual images on the display device of the information handling system.

12. The method of claim 11, further comprising detecting all of the executing user applications that the current user is currently interacting with in the foreground; and where the designating each of the applications of the first portion of the concurrently executing multiple applications as target applications comprises designating all of the detected executing user applications that the current user is currently interacting with in the foreground as target applications.

13. The method of claim 11, further comprising determining collective application usage data for the current user that includes the identity and resource utilization of applications that the user has previously interacted with; and where the designating each application of the first portion of the concurrently executing multiple applications as a target application comprises determining the identity of applications that are normally used concurrently by the current user from the collective usage data; and designating all the determined applications that are normally used concurrently by the current user as target applications of the first portion of the concurrently executing multiple applications.

14. The method of claim 11, where the graphics frame rate of the second portion of the concurrently executing multiple applications used to display the visual images on the display device of the information handling system is a displayed frames per second (FPS) of the visual images displayed on the display device of the information handling system; and where the reducing a graphics frame rate of each application of the second portion of the concurrently executing multiple applications to display visual images on the display device of the information handling system further comprises reducing the displayed FPS of each of the applications of the second portion of the concurrently executing multiple applications by a predetermined FPS amount.

15. The method of claim 11, further comprising determining collective application usage data for the current user that includes the identity and resource utilization of applications that the user has previously interacted with; and predicting system resource utilization requirements for each of the designated target applications of the first portion of the concurrently executing multiple applications from the collective application usage data for the current user.

16. The method of claim 15 where the predicted system resource utilization requirements comprise at least one of central processing unit (CPU), graphic processing unit (GPU), or data input/output (I/O) utilization for each of the designated target applications of the first portion of the concurrently executing multiple applications.

17. The method of claim 15, further comprising using the predicted system resource utilization requirements to determine whether or not sufficient total system resources are available on the information handling system to simultaneously satisfy the predicted system resource utilization requirements of each of the designated concurrently executing target applications of the first portion of the concurrently executing multiple applications when all of the designated target applications are concurrently executing simultaneously with all of the applications of the second portion of the concurrently executing multiple applications executing with the reduced graphics frame rate; and then:

simultaneously executing each of the designated target applications of the first portion of the concurrently executing multiple applications with a full non-reduced graphics frame rate if it is determined that sufficient total system resources are available to simultaneously satisfy the predicted system resource utilization requirements of all of the designated concurrently executing target applications of the first portion of the concurrently executing multiple applications; and executing one or more of the designated target applications of the first portion of the concurrently executing multiple applications that have a higher priority with a full non-reduced graphics frame rate while at the same time executing one or more of the designated target applications of the first portion of the concurrently executing multiple applications that have a lower priority with a reduced graphics frame rate if it is determined that sufficient total system resources are not available to simultaneously satisfy the predicted system resource utilization requirements of each of the designated concurrently executing target applications of the first portion of the concurrently executing multiple applications.

18. The method of claim 15, further comprising comparing the identity of each of the designated target applications of the first portion of the concurrently executing multiple applications to a predefined list of prioritized applications to determine that at least a first one of the designated target applications of the first portion of the concurrently executing multiple applications has priority over at least one second one of the designated target applications of the first portion of the concurrently executing multiple applications; and executing the first designated target application of the first portion of the concurrently executing multiple applications with a full non-reduced graphics frame rate while at the same time executing the second designated target application of the first portion of the concurrently executing multiple applications with a reduced graphics frame rate if it is determined that sufficient total system resources are not available to simultaneously satisfy the predicted system resource utilization requirements of each of the designated concurrently executing target applications of the first portion of the concurrently executing multiple applications.

19. The method of claim 15, further comprising determining that a user is currently interacting with a first one of the designated target applications of the first portion of the concurrently executing multiple applications in the foreground; and then executing the first designated target application of the first portion of the concurrently executing multiple applications with a full non-reduced graphics frame rate while at the same time executing at least one other of the designated target applications of the first portion of the concurrently executing multiple applications with a reduced graphics frame rate if it is determined that sufficient total system resources are not available to simultaneously satisfy the predicted system resource utilization requirements of each of the designated concurrently executing target applications of the first portion of the concurrently executing multiple applications.

20. The method of claim 15, further comprising determining at least one prioritized application to prioritize over one or more other applications based on the collective application usage data; then determining whether any one of the designated target applications of the first portion of the concurrently executing multiple applications corresponds to the prioritized application; and then executing any designated target application of the first portion of the concurrently executing multiple applications that is determined to correspond to the prioritized application with a full non-reduced graphics frame rate while at the same time executing at least one other of the designated target applications of the first portion of the concurrently executing multiple applications that does not correspond to the prioritized application with a reduced graphics frame rate if it is determined that sufficient total system resources are not available to simultaneously satisfy the predicted system resource utilization requirements of each of the designated concurrently executing target applications of the first portion of the concurrently executing multiple applications.

* * * * *